Figure 1:
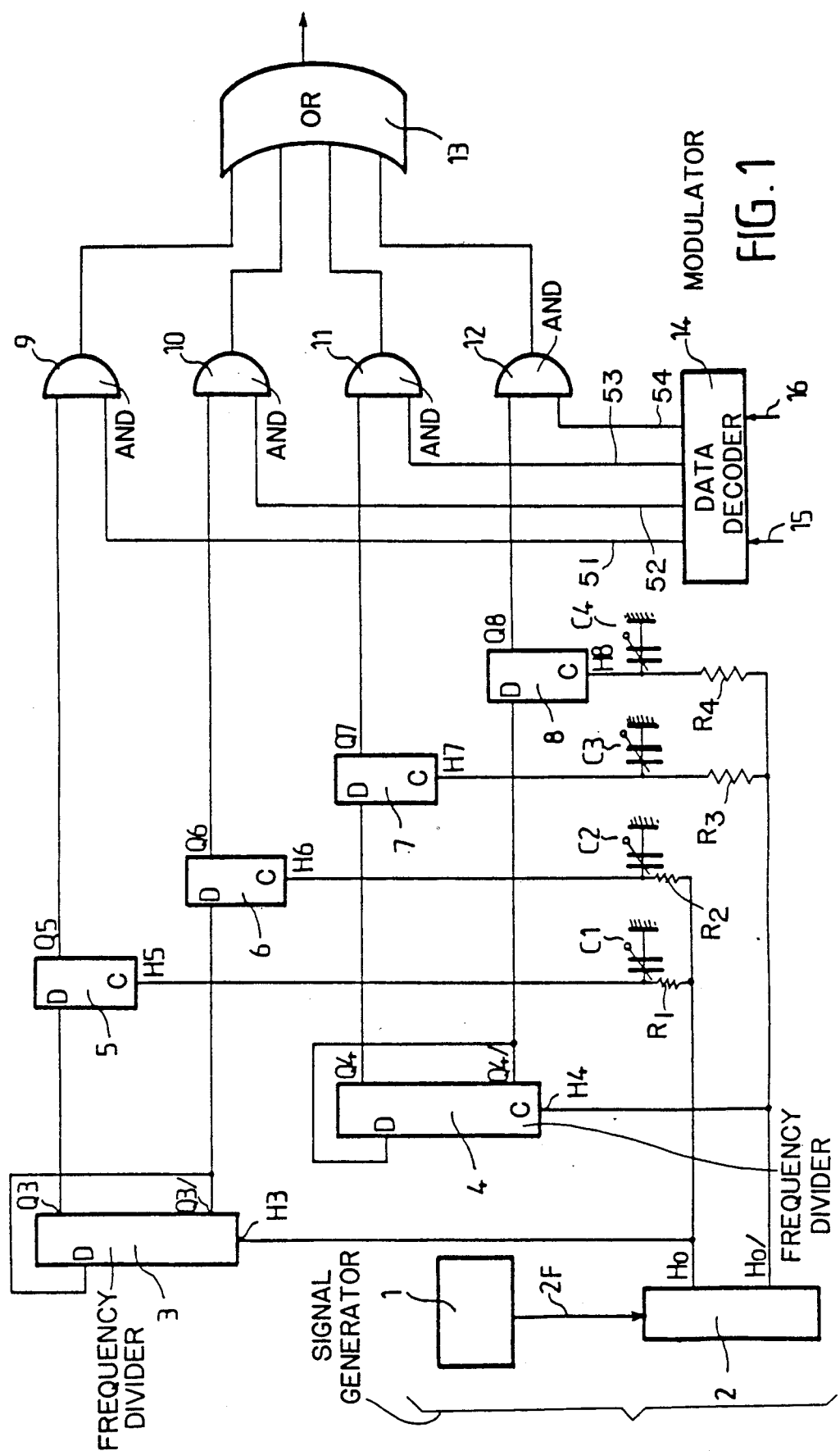

United States Patent [19]

Verdot

[11] Patent Number: 4,999,590

[45] Date of Patent: Mar. 12, 1991

[54] FOUR STATE PHASE SHIFT MODULATOR, IN PARTICULAR FOR AMPLITUDE MODULATION OF TWO CARRIERS IN QUADRATURE WITH A LARGE NUMBER OF STATES

[76] Inventor: Georges Verdot, 33, rue de l'aérodrome, 22300 Lannion, France

[21] Appl. No.: 523,842

[22] Filed: May 15, 1990

Related U.S. Application Data

[63] Continuation of Ser. No. 255,362, Oct. 7, 1988, abandoned.

[30] Foreign Application Priority Data

Oct. 21, 1987 [FR] France ................. 87 14755

[51] Int. Cl.⁵ ............... H04L 27/20; H04L 27/36
[52] U.S. Cl. ..................... 332/104; 375/39; 375/54; 375/67
[58] Field of Search ............ 332/9 R, 16 R, 21, 22, 332/23 R, 31 R, 103–105; 375/39, 52, 53, 54, 67

[56] References Cited

U.S. PATENT DOCUMENTS

| | | | |
|---|---|---|---|
| 3,659,202 | 4/1972 | Kaneko | 375/53 |
| 3,816,657 | 6/1974 | Fletcher et al. | 375/53 |
| 4,206,423 | 6/1980 | Nossen | 332/9 R |

FOREIGN PATENT DOCUMENTS

| | | |
|---|---|---|
| 0031762 | 7/1981 | European Pat. Off. |
| 0225269 | 6/1987 | European Pat. Off. |
| 2469062 | 5/1981 | France |

OTHER PUBLICATIONS

Morais et al., "NLA-QAM: A Method for Generating High-Power QAM Signals Through Nonlinear Amplification", IEEE Trans. on Communications, vol. COM-30, Mar. 1982, pp. 517–522.

Primary Examiner—Siegfred H. Grimm
Attorney, Agent, or Firm—Laff Whitesel Conte & Saret

[57] ABSTRACT

A QPSK modulator has a signal generator which generates four carrier outputs having respective phases of 0°, 90°, 180°, and 270°. A four input phase selector is connected to the four outputs of the generator, has four modulator signal inputs, and has four phase shifted carrier outputs connected to an OR gate which provides the QPSK output signal. The generator comprises a source of signals in opposite phase coupled to two frequency dividers, each divider having two outputs of opposite phase. It also has two pairs of flip-flops whose outputs form the four outputs of the generator. The signal inputs of one pair of flip-flops are connected to the outputs of the first divider. The signal inputs of the other pair of flip-flops are connected to the outputs of the second divider. Variable capacitors are provided between the clock inputs of the flip-flops and ground. A $2^{2n}$ QAM modulator can be formed with n QPSK modulators whose outputs are connected to the inputs of n attenuators followed by an adder.

4 Claims, 3 Drawing Sheets

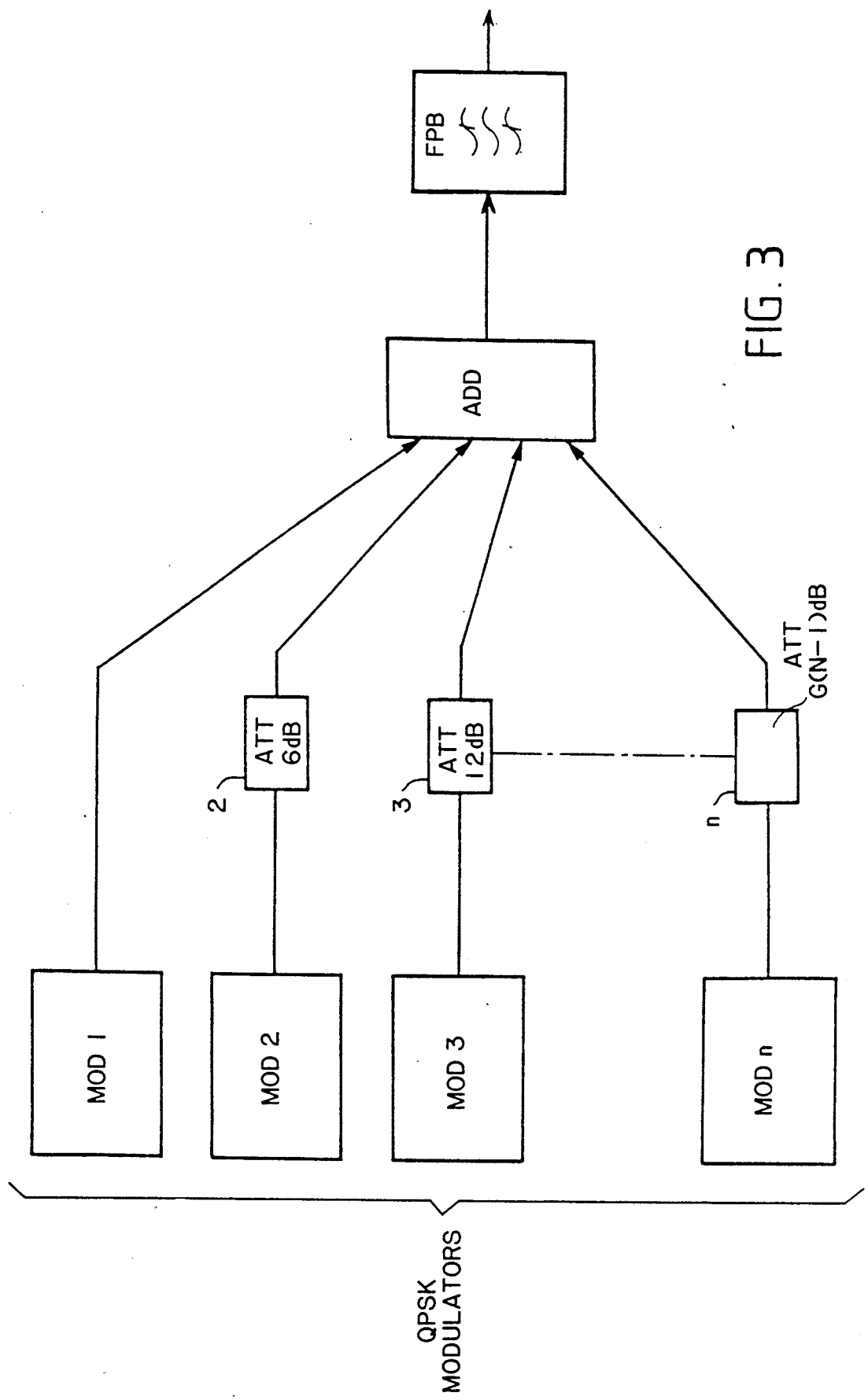

FOUR STATE PHASE SHIFT MODULATOR, IN PARTICULAR FOR AMPLITUDE MODULATION OF TWO CARRIERS IN QUADRATURE WITH A LARGE NUMBER OF STATES

This application is a continuation of application Ser. No. 07/255,362, filed Oct. 7, 1988 and now abandoned.

The present invention relates to a phase shift modulator for amplitude modulation of two carriers in quadrature with a large number of states or $2^{2n}$ QAM modulation.

It may be remembered that a four state phase shift modulation signal or QPSK signal is formed of a sinusoidal carrier at frequency fo which takes on one phase state from four possible phase states: 0°, 90°, 180° and 270°, in relation to the digital value of the modulating signal.

In other respects, the digital transmission systems with $2^{2n}$ QAM modulation, where n is large, that is, equal to or greater than 2, are of great interest and are currently widespread in microwave systems in the United States and, to a lesser extent in Japan. The modulation function is accomplished by using high quality ring modulators. On this subject, we can refer to the following documents:

"Design and application of the RD-4A and RD-6A 64 QAM Digital Radio Systems" by J. D. McNicol et al., published in ICC'84 conference records Vol. 2, pp. 646-652, "64 QAM Digital Radio Transmission System. Integration and Performance", by J. A. Grosset and P. R. Hartmann, published in ICC'84 Conference Record Vol. 2, pp 636-641, "Design and Performance of 6 GHz 135 mb/s Radio system with 64 QAM" by Y.Ito et al., published in ICC'84 Conference Record, Vol. 2, pp 632-635, "256 QAM Modem for High Capacity Digital Radio Systems" by Y. Daido:et al., published in Globecom'84. Vol. 2 pp 16.8.1-16.8.5.

High quality ring modulators are expensive. On the other hand, they are analog components, which makes their integration impossible and increases the volume of the modulators.

It is known how to realize $2^{2n}$ QAM modulations from basic modulations generated in QPSK modulators whose output signals are subjected to selective attenuations before being added, but only very precise QPSK modulators are thus useable.

A QPSK modulator, is also known, from document FR-A-2 469 062, the construction of which practically only uses logic circuits. This QPSK modulator can thus be made in integrated form and with other qualities. However, with regards to the precision of the phases of the different states, it reaches a level which is quite suitable when the QPSK modulator is used alone, but is insufficient when a number of signals are added to obtain a high order QAM modulation.

In the document FR-A-2 589 298 there is also a description of a QPSK modulator whose physical structure consists only of logic circuits which can be integrated and whose phase precision is to within a tenth of a degree, which is sufficient to realize high order QAM modulation with integration of the circuits. However, this modulator is not suitable for very high speed modulation. In fact, the flow of signals generated by the selector in the D flip-flops causes the phase transitions to occur in synchronism with the input clock transitions and not with the transitions of the modulating sequence. This causes, when receiving, a jitter in the recovered clock and the importance of this error increases with the modulation speed.

One object of the present invention is to provide a QPSK modulator, in which all the advantages of the modulator described in the patent FR-A-2 589 298 are maintained and which are useable at a high modulation speed.

In accordance with a characteristic of the invention a phase shift modulator is provided with four phases comprising a high frequency signal generator provided with four outputs generating this signal with four different phases, offset by 90° respectively, a phase selector having four carrier inputs connected to the four outputs of the generator respectively, four modulating signal inputs and four phase shifted carrier outputs, each modulating signal input being connected to the control input of a switch placed between a carrier input and a corresponding carrier output, the generator comprising a source of opposed phase signals, two frequency dividers with two outputs with opposing phases, the input of the first divider being connected to the first output of the source and the input of the second divider being connected to the second output of the source, two pairs of flip-flops whose outputs form the four outputs of the generator, the clock inputs of the flip-flops of the first pair being connected to the first output of the source and the clock inputs of the flip-flops of the second pair being connected to the second output of the source, the signal inputs of the flip-flops of the first pair being respectively connected to the outputs of the first divider and the signal inputs of the flip-flops of the second pair being connected to the outputs of the second divider respectively, the four phase shifted carrier outputs being connected to the four inputs respectively of an OR gate generating the QPSK signal.

In accordance with another characteristic, variable capacitor RC circuits are provided between the clock inputs of the flip-flops and ground.

In accordance with another characteristic, a $2^{2n}$ QAM modulator is provided comprising n such QPSK modulators whose outputs are connected to the inputs of n attenuators respectively having attenuation coefficients $6(n-1)$ respectively, with n varying from 1 to n, the outputs of the attenuators being connected to the n inputs of an adder respectively.

Figure 2:
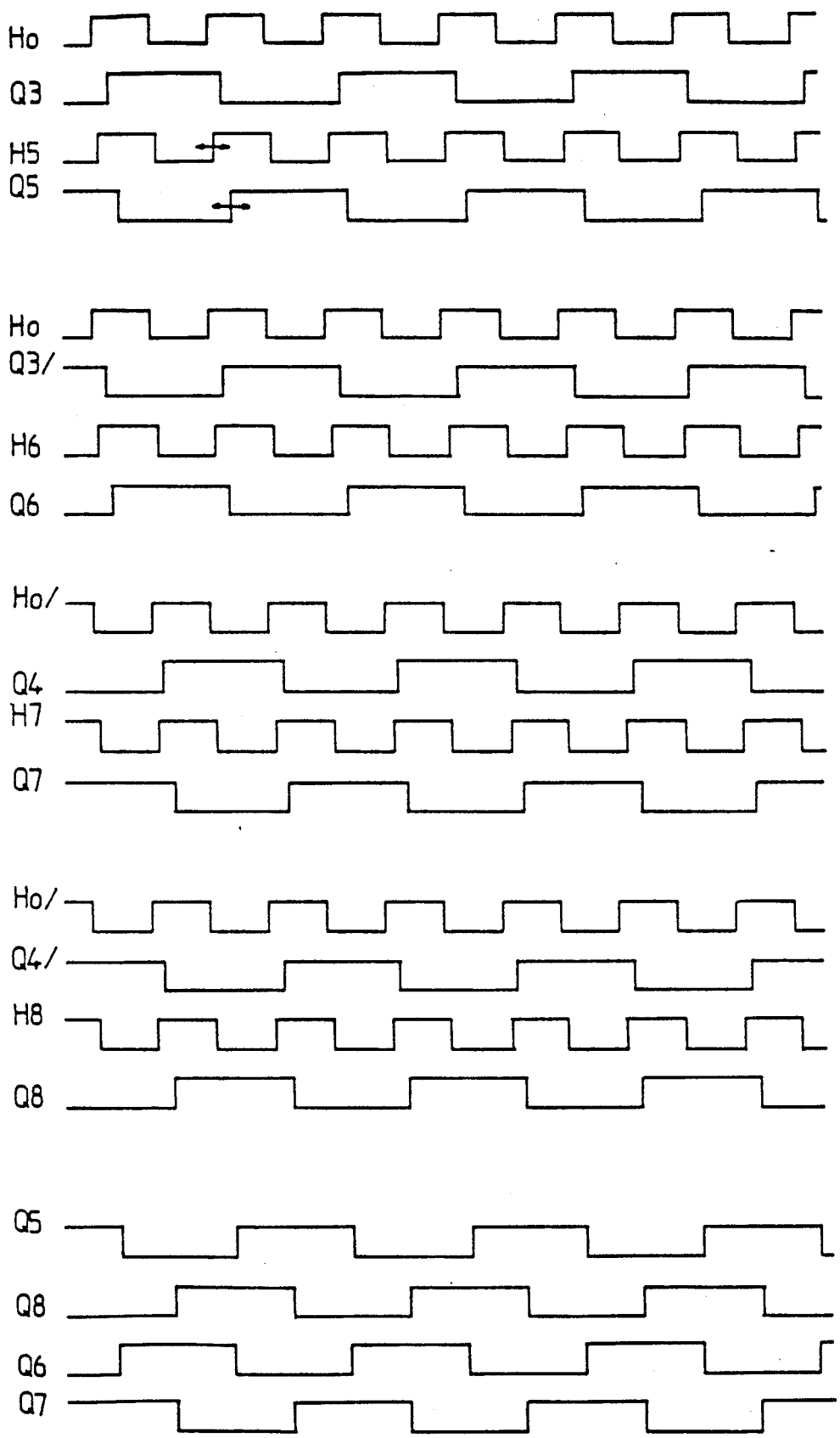

The characteristics of the above mentioned invention, as well as others, will become clearer, upon reading the following description of an embodiment, the description being done in conjunction with the attached drawings, in which:

FIG. 1 is a schematic of a QPSK modulator in accordance with the invention,

FIG. 2 shows a timing diagram illustrating the operation of the modulator of FIG. 1, and FIG. 3 is a block diagram of a $2^{2n}$ QAM modulator in accordance with the invention The demodulator of FIG. 1 is comprised of a generator 1 which generates a signal 2F at a frequency twice that of F. The output of the generator 1 is connected to the input of a frequency divider 2 with two outputs, one generating the signal Ho and the other its compliment Ho/. In the description below, the sign / placed behind the reference to a signal designates the complement of that signal.

The output Ho, generating the signal having the same name, is connected to the clock input H3 of a flip-flop 3 whose inverting output Q3/ is connected to its D signal input The output Ho/generating the signal having the same name, is connected to the clock input H4 of a flip-flop 4 whose inverting output Q4/ is also connected to its D input. The flip-flops 3 and 4, like the other flip-flops used in the modulator, are D type flip-flops.

The direct output Q3 of flip-flop 3 is connected to the D input of a flip-flop 5 whose clock input H5 receives the signal Ho. The inverting output Q3/ of flip-flop 3 is connected to the D input of a flip-flop 6 whose clock input H6 also receives the signal Ho.

The direct output Q4 of flip-flop 4 is connected to the D input of a flip-flop 7 whose clock input H7 receives the signal Ho/. The inverting output Q4/ of flip-flop 4 is connected to the D input of a flip-flop 8 whose clock input H8 also receives the signal HO/.

The clock inputs H5 to H8 of flip-flops 5 to 8 are connected to ground by variable capacitors C1 to C4 respectively.

The direct outputs Q5 to Q8 of flip-flops 5 to 8 are connected to the first inputs of AND gates 9 to 12 respectively, whose second inputs are connected to the outputs 51 to 54 respectively of a data decoder 14. The decoder 14 has a two wire 15 and 16 input to which are applied the binary digits or bits. The set of elements 9 to 12 and 14 make up a phase selector. The outputs of AND gates 9 to 12 are connected to the four inputs respectively of an OR gate 13 which generates the modulated signal.

The variable capacitors C1 to C4 are used to adjust the phases of the signals applied to the clock inputs of flip-flops 5 to 8, that is to adjust the phases of the signals generated by the Q outputs of the flip-flops.

The timing diagrams of FIG. 2 are signal waveforms which are identified by the input terminals to which the signals are applied or by the output terminal which generate these signals. Thus, the waveform H3 corresponds to the signal applied to the input H3 of flip-flop 3, and waveform Q3 corresponds to the signal generated by the output Q3, etc.

The diagrams of FIG. 2 illustrate that the flip-flop 3 operates as a half divider and that the leading edge of the signal Ho puts the Q3 output at the high level when the output Q3/ is at the high level. The signal H5 has the same frequency as the signal Ho but has a slight delay with respect to it. This delay, which is small with respect to the period, is adjustable through variable capacitor C1. The setting of the delay is adjustable to within a tenth of a degree. When the signal H5 is applied and the signal Q3 is at the high level, this level is recopied on the output Q5 with delay corresponding to the transition time of flip-flop 5. In FIG. 2, we have on the active leading edge of H5 and the leading edge of Q5, shown small arrows indicating that the instant of the leading edge can be adjusted through the means of a variable capacitor C1.

FIG. 2 illustrates in the same manner the waveforms of the signals allowing the signals Q6, Q7 and Q8 to be obtained, the waveforms of these signals being repeated to show their delay of a quarter period.

To each quaternary symbol 00,01,10,11 made up by the pair of bits applied at the bit rate, there corresponds one of the four outputs of decoder 14 enabled during one clock duration Ho. During one symbol period, only one of the gates 9 to 12 is open, the three other being inhibited.

With respect to document FR-A-2 589 298 in which the signal shaping flip-flops operate on modulated signals such that upon reception, the regeneration of the clock from the pulse train was affected, in the modulator of the invention, the modulating signals are applied behind the shaping flip-flops which themselves are phase adjustable. The jitter due to the modulator is thus removed and eases the bit clock regeneration.

The QPSK modulator of FIG. 1 is useable to generate 16 QAM and 64 QAM modulations or even higher order QAM modulations. The modulator of FIG. 3 consists of n basic QPSK modulators MOD1 to MODn, which are each identical to the modulator of FIG. 1. The outputs of the modulators MOD2 to MODn are connected to the inputs of (n−1) attenuators ATT2, ATT3, . . . , ATTn respectively whose attenuation coefficients are 6db, 12db, . . . 6(n−1)db respectively. The output of modulator MOD 1 and that of attenuators ATT2 to ATTn are connected respectively to the inputs of an adder ADD whose outputs provides the $2^{2n}$ QAM modulation signal.

The output of adder ADD is, preferably connected to a band-pass filter BPF centered at the carrier frequency Fo and whose bandwidth is a function of the modulating pulse train.

I claim:

1. A four state phase shift modulator comprising a high frequency signal generator provided with four outputs Q5 to Q8 generating signals with four different phases, each phase shifted by 90° respectively, a four input phase selector connected to the four outputs of the generator and having four modulating signal inputs and four phase shifted carrier outputs, the generator having a source of signals providing first and second outputs with opposing phases, two frequency dividers each having two outputs in opposing phases and each having a clock input, the clock input of the first divider being connected to the first output of the source of signals and the clock input of the second divider being connected to the second output of the source of signals, two pairs of flip-flops whose outputs make up the four outputs of the generator, the clock inputs of the first pair of flip-flops being connected to the first output of the source of signals and the clock inputs of the second pair of flip-flops being connected to the second output of the source of signals, the signal inputs of the first pair of flip-flops being connected to the outputs of the first divider and the signal inputs of the second pair of flip-flops being connected to the outputs of the second divider respectively, the four phase shifted carrier outputs being connected to the four inputs of an OR gate respectively, generating a QPSK modulation signal.

2. A modulator in accordance with claim 1, in which RC circuits with variable capacitors are connected between each clock input of the first pair of flip-flops and ground.

3. A $2^{2n}$ QAM modulator comprising a plurality (n) of QPSK modulators, n attenuators, and an adder; each of said QPSK modulators being coupled via one of said attenuators to said adder which produces a QAM output signal; each of said attenuators providing an attenuating coefficient 6(n−1), with n varying from 1 to n; and each of said QPSK modulators comprising:

a high frequency signal generator provided with four outputs Q5 to Q8 generating signals with four different phases, each phase being shifted by 90° respectively, a four input phase selector connected to the four outputs of the generator and having four modulating signal inputs and four phase shifted carrier outputs, the generator having a source of signals provided first and second outputs with opposing phases, two frequency dividers each having two outputs in opposing phases and each having a clock input, the clock input of the first divider being connected to the first output of the source of signals and the clock input of the second divider being connected to the second output of the source of signals, two pairs of flip-flops whose outputs make up the four outputs of the generator, the clock inputs of the first pair of flip-flops being connected to the first output of the source of signals and the clock inputs of the second pair of flip-flops being connected to the second output of the source of signals, the signal inputs of the first pair of flip-flops being connected to the outputs of the first divider and the signal inputs of the second pair of flip-flops being connected to the outputs of the second divider respectively, the four phase shifted carrier outputs being connected to the four inputs of an OR gate respectively, generating a QPSK modulation signal.

4. A modulator in accordance with claim 3, in which RC circuits with variable capacitors are connected between each clock input of the first pair of flip-flops and ground.

* * * * *